Nov. 23, 1965     L. W. REYNOLDS     3,218,958

AUTOMATIC BARBECUE MACHINE AND METHOD OF COOKING MEATS

Filed April 19, 1962     4 Sheets-Sheet 1

INVENTOR.
Lewis W. Reynolds

BY

ATTORNEY

INVENTOR.
Lewis W. Reynolds

ATTORNEY

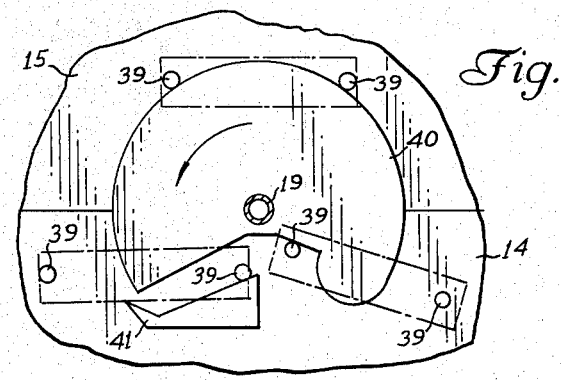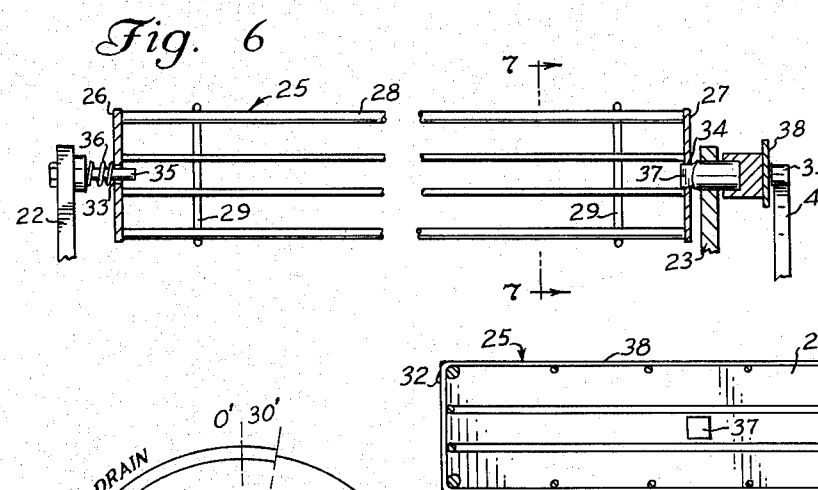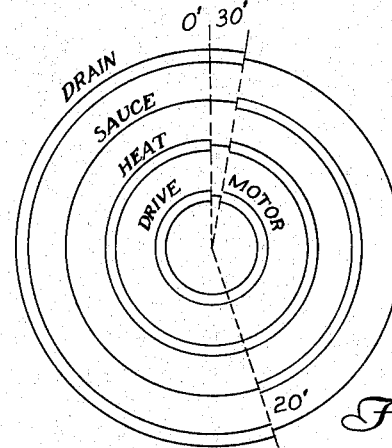

3,218,958
AUTOMATIC BARBECUE MACHINE AND
METHOD OF COOKING MEATS
Lewis W. Reynolds, 2957 Hardman Court NE.,
Atlanta, Ga.
Filed Apr. 19, 1962, Ser. No. 192,020
6 Claims. (Cl. 99—346)

This invention relates to an oven and is more particularly concerned with an automatic barbecue machine.

In the past, many barbecue machines have been devised; however, such prior art machines have had many disadvantages. Such machines usually processed a relatively low volume of meat by carrying the meats inserted on spits which faced in one direction during the entire operation, thereby causing the meat to be overcooked on one side and undercooked on the reverse side. These machines usually required that the meats be subjected to heat for an extended period of time, thereby drying out the meat and appreciably reducing the weight of the edible product.

To determine when the meat was done, it was usually necessary to stop the machine, open the machine, and insert a meat thermometer into one unit of the meat. To aid the producer in determining when to insert the thermometer, the prior art machines usually had large transparent windows through which the meat could be observed, the windows radiating a substantial amount of heat.

Briefly, to overcome the disadvantages inherent in the prior art, I have devised a relatively compact efficient machine which is automatically operated to barbecue evenly a high volume of meat in a short period of time, the meat being basted continuously during the basting period. The machine is easy to load, unload and lends itself readily to being cleaned.

In general terms, the machine includes an oven having a relatively cylindrical cooking chamber with electrical heating units disposed in the upper inner periphery of the oven. The meat is carried on a plurality of flat wire racks or baskets having wire covers which are readily opened and closed. The baskets, in turn, may be inserted in or removed from the machine and are carried in radially spaced positions around a horizontal axis of rotation by a pair of opposed plates driven from a motor. The plates also carry scoops which, when sauce is provided in the bottom of the oven, pick up the sauce upon each revolution and then discharge the sauce onto the meat.

The automatic control for the machine includes a timer, a sauce or liquid, infeed and drain, and a smoke producing mechanism electrically interconnected with the motor and heating elements so as to provide the proper sequence of events, automatically, for the barbecuing operation.

The method of the present invention is practiced by the machine as follows: The meats are first loaded in the baskets and the baskets installed in the machine. Preferably, if chickens are to be prepared, they should be split so as to provide relatively flat meat portions or units. The basket holds the meat units in a flat position side-by-side along the entire length of the basket. When the meat is installed in the oven, the timer is set to permit the meat units to be heated on one side and then turned continuously until substantially all foreign water and some of the extraneous fluids and fat have drained from the meats into the bottom of the oven and thence to the drain. The smoke producing mechanism is operated during this first period to impart the hickory flavor.

After a predetermined period, the drain is closed and fluid sauce is automatically fed into the bottom of the oven. When the level of the liquid reaches a proper height, the scoops automatically pick up the fluid, carrying the same in an arcuate path and discharging the liquid onto their associated meat portions. When the cycle is completed, the baskets are removed, opened, and the meat units discharged therefrom.

Accordingly, it is an object of the present invention to provide a barbecue machine which will process a high volume of meat in a short period of time while basting the meat and subjecting the meat to smoke.

Another object of the present invention is to provide an automatic barbecue machine which will pass one side of a piece of meat adjacent heating units, then automatically turn the meat and pass the other side adjacent the heating elements.

Another object of the present invention is to provide a barbecue machine which will cook meats rapidly with little loss of weight and with little shrinkage of the meat.

Another object of the present invention is to provide a barbecue machine which may be readily and easily cleaned.

Another object of the present invention is to provide a barbecue machine which is essentially automatic and requires no appreciable attention except to load and unload the machine.

Another object of the present invention is to provide a barbecue machine which holds the meat without requiring the piercing of the meat with skewers of spits.

Another object of the present invention is to provide a barbecue machine which will evenly cook the meat processed therein.

Another object of the present invention is to provide a barbecue machine in which the baskets which carry the meat are readily and easily installed and removed from the machine and in which any predetermined piece or unit of meat may be removed from a selected basket therein without the necessity of removing other pieces or units of meat from the oven or from the basket.

Other objects, features and advantages of the present invention will become apparent from the following description when taken in conjunction with the accompanying drawing wherein like characters of reference designate corresponding parts throughout the several views and wherein:

FIG. 5 is a cross sectional view taken substantially along line 5—5 in FIG. 3.

FIG. 6 is a longitudinal sectional view of one of the baskets of the machine shown in FIG. 1.

FIG. 7 is a cross sectional view substantially taken along line 7—7 in FIG. 6.

FIG. 8 is a schematic representation of a cycle of the machine.

Figure 1:
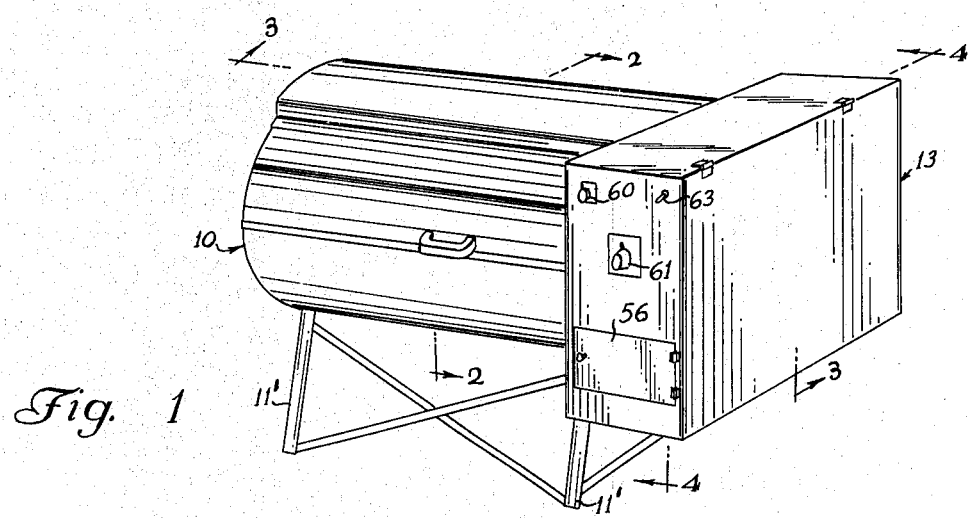
FIG. 1 is a perspective view of a barbecue machine constructed in accordance with the present invention.
Figure 2:
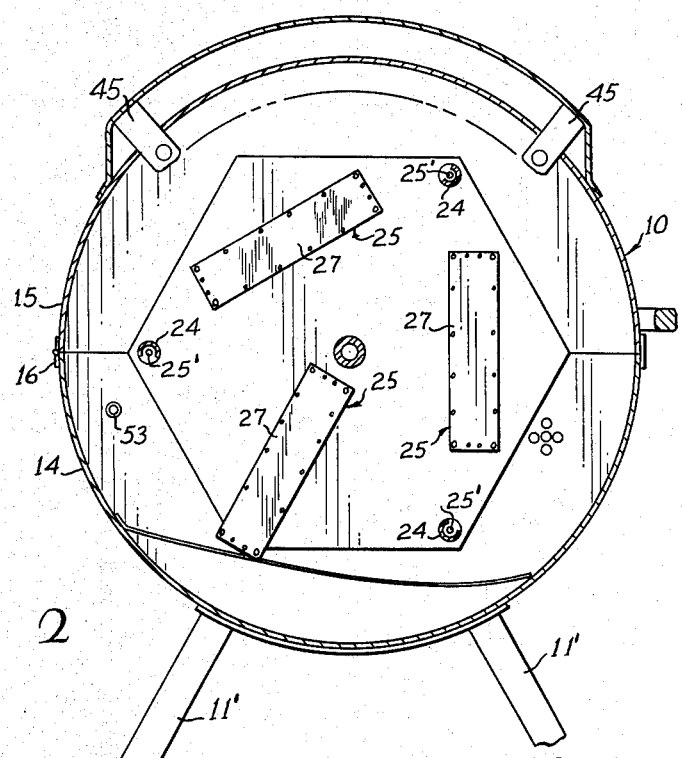
FIG. 2 is a cross sectional view taken substantially along line 2—2 in FIG 1.
Figure 3:
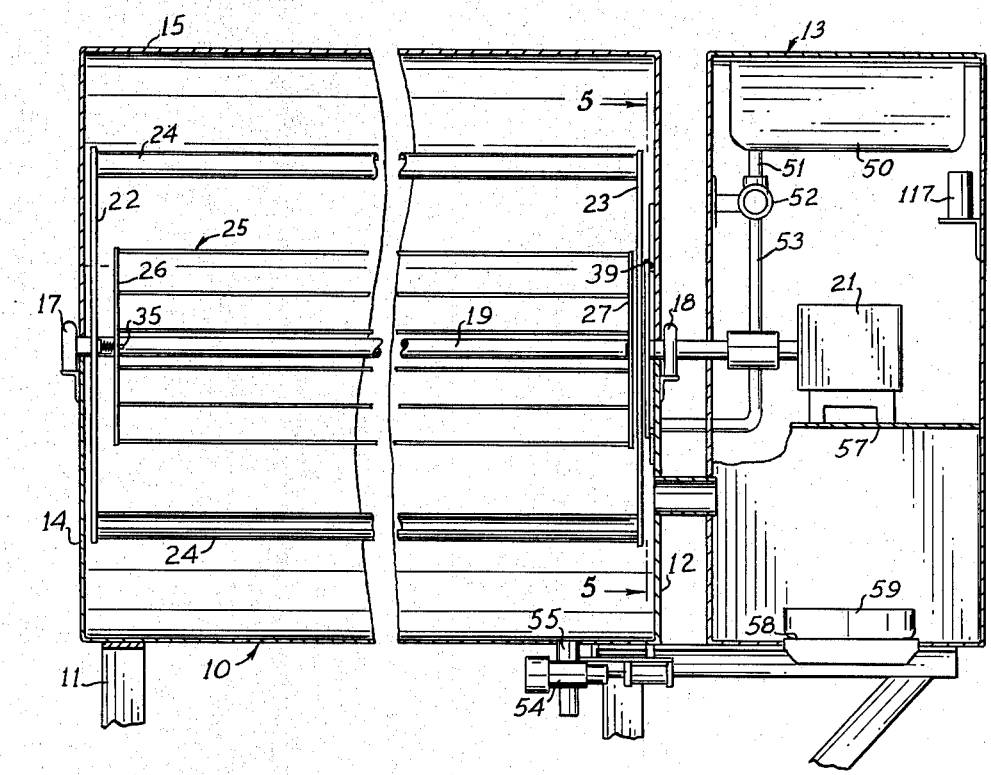
FIG. 3 is a cross sectional view taken substantially along line 3—3 in FIG. 1.
Figure 4:
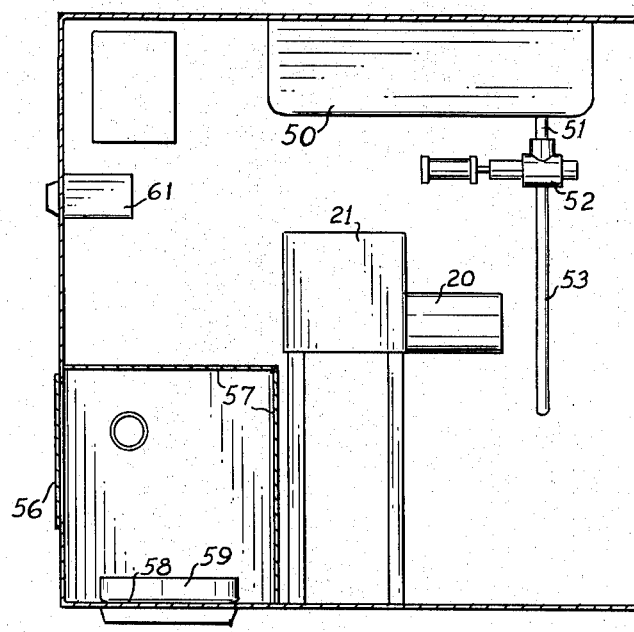
FIG. 4 is a cross sectional view taken substantially along line 4—4 in FIG. 1.

Referring now in detail to the embodiment chosen for the purpose of illustrating the present invention, it being understood that in its broader aspects the present invention is not limited to the exact details herein depicted, numeral 10 denotes generally the oven of the machine which is supported on legs 11'. Preferably the oven is a cylindrical drum, the axis of which is disposed horizontally. The ends of the cylindrical drum 10 are closed by end plates 11 and 12.

The legs 11' also support a rectangular housing 13 adjacent one end of the drum 10. The housing contains the electrical mechanism and smoking apparatus, as will be more fully explained hereinafter.

The drum 10 is split horizontally to provide a bottom portion 14 and a cover portion 15, hingedly secured together by hinges 16 along their back sides to permit ready access to the heating chamber when the cover portion is raised and pivoted rearwardly, while providing a relatively closed right cylindrical chamber when the cover portion 15 is in registry with the bottom portion 14.

Along the axis of drum 10 and carried respectively by the bottom portions of end plates 11 and 12 are U-shaped bearing members 17 and 18 which, in turn, journal a horizontal shaft 19. One end of shaft 19 is connected to a motor 20 within housing 13 through a gear reducer 21 therein. Thus, the shaft 19 may be rotated about its axis by motor 20 when the motor is energized.

Carried by shaft 19, inwardly adjacent the end plates 11 and 12, are the opposed basket carrying plates 22 and 23. Plates 22 and 23 are, therefore, vertically disposed for rotation with shaft 19. Preferably, plates 22 and 23 are flat polygons slightly smaller in diameter than the diameter of the drum 10. Disposed between the plates parallel to shaft 19 are a plurality of evenly spaced scoops or ladles 24, the function of which is to scoop up the liquid in the bottom of the drum 10 and carry it in an arcuate path so as to dump the liquid over the meat immediately prior to the time the meat passes beneath the heating elements. The scoops 24 are each U-shaped in cross section and are facing in the direction of rotation of the plates 22 and 23, the scoops 24 being secured by their ends to the peripheral portions of plates 22 and 23 by bolts 25'.

In the present embodiment, the scoops 24 are arranged 120° apart, even though, it will be understood, more scoops 24 may be provided if desired.

Inwardly of the scoops 24 are the meat carrying baskets, denoted generally by numeral 25. Each basket has a pair of opposed sheet metal ends 26 and 27 and wire stringer 28 running between the ends 26 and 27 to form sides and a bottom. Reinforcing rods 29 extend between the stringers 28.

Each basket 25 has a hingedly secured wire frame top 38 which is formed from criss-crossed wire formed in much the same manner as the bottom and sides of the basket. The reinforcing rods 31 of top 30 extend around the topmost stringer 28 of one side and are bent inwardly adjacent the other side to provide a terminal flange 32 for the top 30 which overlies the other side, thus providing a latch by which the top is locked in a closed position on its associated basket 25 but is readily openable. In cross section, therefore, the basket 25 is essentially rectangular and in plan view the basket is a very much elongated rectangle.

One end 26 is provided with a central round hole 33 while the other end 27 is provided with a square hole 34. For cooperating with the round holes 33, the plate 23 is provided with a plurality of stub shafts 35 arranged in radially evenly spaced relationship so as to lie in a radial plane equidistant between the radial planes of the two adjacent scoops 24. In other words, with the scoops 24 arranged at 0°, 120° and 240°, the stub shafts 35 are arranged at 60°, 180° and 300°. Each stub shaft 35 carries a spring 36 which, when the end 26 is received on the stub shaft 35, yieldably urges the end 26 away from the plate 23.

Opposite to the stub shafts 35 are a plurality of square ended rotate pins 37 journalled by the plate 24. Each pin 37 is adapted to receive by its square inner end portion the square hole 34 of the end 27 of a basket 25. On the outer side of plate 24, the pin 37 is provided with a lever 38 secured thereto by its central portion. Each lever 38 carries at both ends a cam following roller 39 for cooperating with a stationary cam plate 40 carried by the lower portion of end plate 12. The cam plate 40 has a circular upper surface through about 260° to about 280°, the surface being concentric with the shaft 19. The bottom portion of cam plate 40, however, curves inwardly to terminate at shaft 19. A curved rotate plate 41 is disposed below the rear surface of cam plate 40 to provide therebetween a track for the forward cam wheel or roller 39 to cause the roller 39 to move inwardly and pivot the pin 37 through 180° as the pin 37 passes adjacent the bottom portion of drum 10.

It is understood, of course, that a basket 25 is disposed between a stub shaft 35 and a rotate pin 37. This is accomplished by placing round hole 33 over pin 35 and urging the basket 25 against spring 36 to depress the same. Thereafter, the square hole 34 is aligned with the square end of pin 37 and the basket 25 released so that spring 36 urges the hole 34 onto the pin 37.

The stub shafts 35 and pins 37 are spaced inwardly of scoops 24 sufficiently that each basket 25 will just clear the scoop 24 and the curved bottom of drum 10 when it is rotated 180° by pin 37. During the remainder of its travel, the basket 25 is held disposed essentially perpendicular to the radial plane of its associated shaft 35 and pin 37 so that only one side of all meats carried by the basket 25 is disposed outwardly during the upper portion of its travel in one cycle.

The heating element or elements 45 carried by insulation is disposed in the top of the drum 10. Heating elements 45 include a plurality of electrical heating rods arranged parallel to shaft 19 and disposed in the upper 90° of the drum 10. Other suitable heating elements may be employed, if desired. Preferably the heating elements generate a very substantial amount of radiant or infrared heat and pull about 17.5 Kw.

Referring now to the housing 13, in the upper portion thereof is a pan or vat 50 which is adapted to carry the liquid basting material, such as barbecue sauce, to be applied to the meat. A tube 51 leads from the pan to a piston operated valve 52. A tube 53 leads from valve 52 through housing 13 and end plate 12. When valve 52 is open, the liquid in pan 50 feeds by gravity through tubes 51, 53 into the bottom of drum 10.

A valve 54 similar to valve 52 is connected to a drain pipe 55 leading from the central bottom portion of drum 10. This permits all liquid to be drained from the bottom of drum 10 when the valve 54 is open.

In the front of housing 13 is an opening having a hinged door 56. Within the housing are metal plates 57 which define a smoke chamber having a circular heating element 58 which carries a metal pot or pan 59. A duct passing through one of the plates 57 leads through housing 13 and the lower portion of end plate 12 so as to permit the smoke generated in the smoke chamber to be discharged into drum 10. If necessary, the cam plate 40 may be perforated to provide a suitable passageway for the smoke.

Supported by the front of housing 13 is a rheostat 60 for prescribing the amount of electricity to be supplied to the heating element 58. The front of the housing 13 also carries a timer 61 which has preset cams for closing and opening the valves 52 and 54, and an on-off two-position switch 63.

Figure 9:
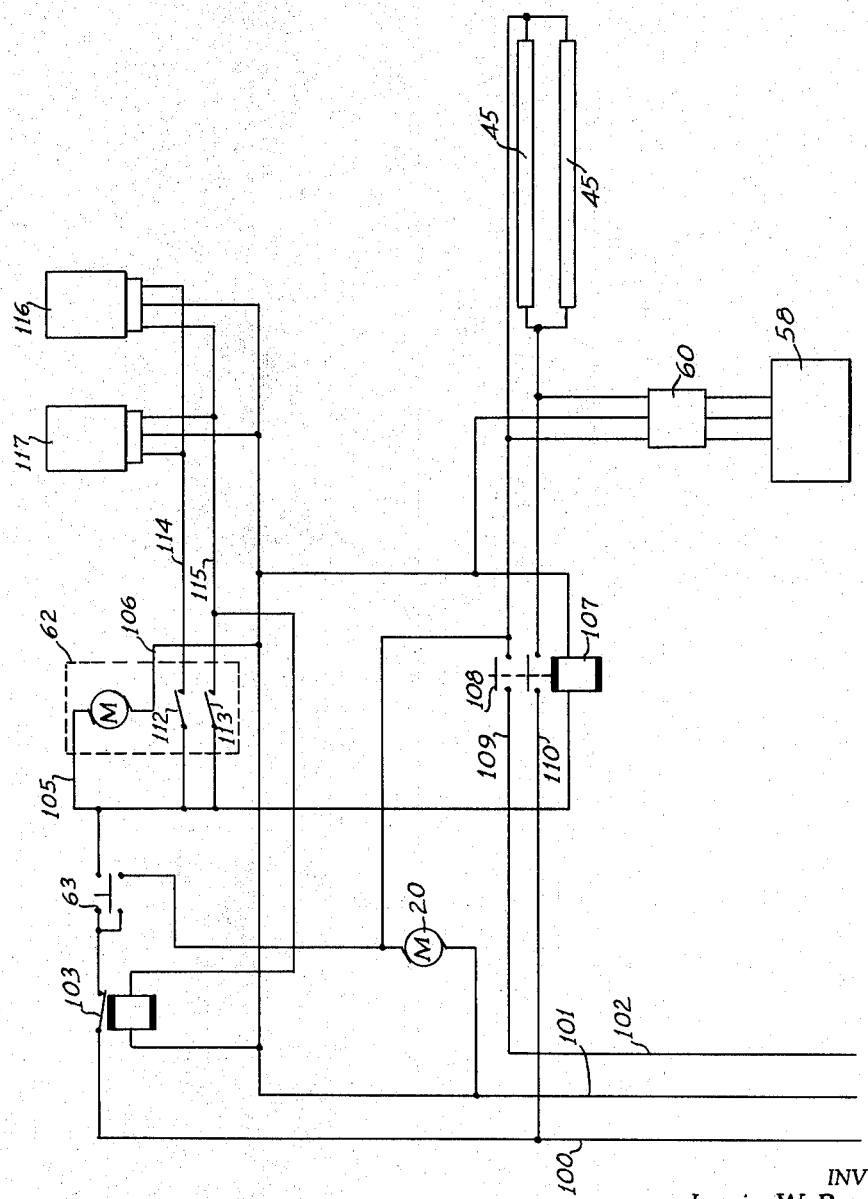
FIG. 9 is a schematic wiring diagram of the circuitry of the mechanism of the machine of FIG. 1.

Referring now to the circuitry of FIG. 9, current is supplied from a source of current via wires 100, 101 and 102, the wire 101 being a ground for the single phase 220 v. current of wires 100, 102. Wires 100 supplies 110 v. current through the normally closed switch 103 of a cut-off relay 104 to switch 63 and thence via wire 105 to the timer motor of timer 62. Ground wire 106 leads from the motor of timer 62 to ground wire 101.

In parallel with the motor of timer 62 is the coil of the heating element relay 107 which, when energized, closes its switch 108 to simultaneously energize, via wires 109 and 110, the main heating element 45 and the main motor 20. Thus, the rotisserie begins to revolve and heat for cooking the meat is created.

In parallel with the heating element is the rheostat 60 which leads to the heating element 58 of the smoke chamber. Thus, wood chips in the pan on the heating element 58 are heated to supply smoke to drum 10.

The timer 62 has two switches 112 and 113 which, when closed, supply current respectively via wires 114 and 115 to opposite sides of solenoids 116 and 117. The solenoids 116 and 117, in turn, control the supply of compressed air to actuate valves 52 and 54, respectively. The arrangement is such that valve 117 controls the drain valve 54 so that it is open when the liquid supply valve 52 is closed and vice-versa. When the timer 62 is set, the switches 112 and 113 are open. Therefore, during the first portion of the cycle the supply valve 52 is closed and the drain valve 54 is open.

This permits the meat to be drained and cook and be smoked during the first portion of the cycle. As the later portion of the cycle is approached, the timer 62 closes switch 112 so as to apply current to one side of each of solenoids 116, 117. This, in turn, applies compressed air to shift the valves 52, 54, thereby closing valve 54 and opening valve 52. The opening of valve 52 permits the liquid from pan 50 to feed into drum 10 via valve 52 and to remain therein during the later part of the cycle until, immediately prior to shut-off, the switch 112 is opened and switch 113 is closed so that valve 52 is closed and valve 54 is opened and thus the basting liquid is drained from drum 10. The closing of switch 113 energizes relay 104 to open switch 103 and interrupt current to relay 107 to open switch 108. This deenergizes motor 20 and heating elements 45.

During the period when the basting liquid is in the drum 10, the scoop 24 successively picks up the liquid and, as a basket 25 immediately behind a scoop 24 approaches the heating element 45, the liquid is dumped onto the leading side of the meat therein. The arrangement is such that the basting liquid flows on both the bottom and top sides of the meat in the basket 25 and thoroughly wets essentially all surfaces of the meat each cycle.

In practice, the present device is particularly well suited to the barbecuing of chicken halves and ribs of beef and pork. When processing chicken, 120 halves of chicken have been processed in one-half hour as compared to the processing of only 24 chickens in one hour-forty five minutes using a prior art machine of a comparable size.

In processing chickens, or ribs for that matter, the timer 62 is set to 30 minutes, the cams therein being arranged to actuate the switch 112 after twenty minutes have elapsed. Thus, the machine drains for twenty minutes and bastes for ten minutes. The heating-smoking and draining removes blood and contaminating liquid from the meat, thus reducing to a minimum the dark stains associated with cooked blood.

The broiler-frier chicken halves are placed side-by-side in the baskets 25 by opening the top 30 and then snapping it closed on the meat; the baskets 25 passing them closely adjacent the heating element 45, reversing automatically the side exposed to the heat, each cycle. Hence, an outer side of a chicken half would be passed adjacent the heating element on odd cycles and the inner half on even cycles or vice-versa.

The machine is so constructed that the meat is held facing the heating element 45 at about 3 to 4 inches therefrom and is basted immediately prior to being subjected to the direct rays of the heating element 45, i.e. while the meat is held upright or on end. The scoops 24 pass within approximately $\frac{1}{16}$ inch of the bottom during each cycle and hence are able to utilize substantially all of the basting liquid.

It will be understood that while I have particularly described the barbecuing of chicken using basting cooking and smoking in my machine, my machine is also suitable for barbecuing or simply cooking or cooking with smoke (without liquid basting) chickens, pork ribs, beef ribs, brisket of beef, hamburger, steaks, lamb or pork chops, fish, shell fish and other flat cuts of meat.

It will be obvious to those to those skilled in the art that many variations may be made in the embodiment chosen for the purpose of illustrating the present invention without departing from the scope thereof as defined by the appended claims.

I claim:

1. A barbecue machine comprising a horizontally disposed cylindrical drum having end plates and defining a cylindrical cooking chamber, said drum being divided to provide a bottom portion and a cover portion, hinges joining said bottom portion and said cover portion, a rotisserie disposed within said drum, said rotisserie including a horizontal shaft disposed for rotation along substantially the axis of said drum, a motor disposed externally of said drum for rotating said shaft, a pair of opposed basket supporting plates carried by said shaft between said end plates, a plurality of meat carrying baskets rotatably supported between said opposed plates for movement in a circular path and for disposing meat within said baskets with one side outwardly, means for rotating each basket through 180° during a portion of its cycle, a plurality of scoops disposed between said opposed plates for picking up liquid at the bottom of said drum and depositing said liquid on the meat within an adjacent basket as said basket holds said meat on one end, a heating element disposed within the cover portion of said drum for heating the outer surface of said meat as its basket passes adjacent said heating element, drain valve means for draining liquid from said drum, a vat disposed adjacent said drum, feed valve means for feeding liquid from said vat to said drum, and means for controlling said valve means to drain liquid from said drum during the first portion of a cycle of the machine and for thereafter closing said drain valve means and opening said feed valve means to supply liquid to said drum during the latter part of said cycle.

2. A barbecue machine comprising a horizontally disposed cylindrical drum having end plates and defining a cylindrical cooking chamber, said drum being divided to provide a bottom portion and a cover portion, hinges joining said bottom portion and said cover portion, a rotisserie disposed within said drum, said rotisserie including a horizontal shaft disposed for rotation along substantially the axis of said drum, a motor disposed externally of said drum for rotating said shaft, a pair of opposed basket supporting plates carried by said shaft between said end plates, a plurality of meat carrying baskets rotatably supported between said opposed plates for movement in a circular path, each basket being characterized by a wire frame forming sides, a bottom and a top, said top being hingedly secured to one side of said basket and latching into engagement with the other side of said basket, means for disposing meat within said baskets with one side outwardly and for rotating each basket through 180° during a portion of its cycle when said basket is adjacent the bottom of said drum, a plurality of scoops disposed between said opposed plates for picking up liquid at the bottom of said drum and depositing said liquid on the meat within an adjacent basket as said basket holds said meat on one end, a heating element disposed within the cover portion of said drum for heating the outer surface of said meat as its basket passes adjacent said heating element, drain valve means for draining liquid from said drum, a vat disposed adjacent said drum, feed valve means for feeding liquid from said vat to said drum, duct means for introducing smoke into said drum, and means for simultaneously controlling said valve means to drain liquid from said drum during the first portion of a cycle of the machine and for thereafter closing said drain valve means and opening said feed valve means to supply liquid to said drum during the latter part of said cycle.

3. A barbecue machine comprising a horizontally disposed drum having end plates and defining hollow cooking chamber, said drum being divided to provide a bottom portion and a cover portion, hinges joining said bottom portion and said cover portion, a rotisserie disposed within said drum, said rotisserie including a horizontal shaft disposed for rotation about substantially the axis of said drum, a motor disposed externally of said drum for rotating said shaft, a pair of opposed supporting plates carried by said shaft between said end plates, a plurality of meat carrying means rotatably supported between said opposed plates for movement in a circular path and for disposing meat within baskets with one side outwardly, means for rotating each basket through 180° during a portion of its cycle, a plurality of scoops extending substantially the distance of said meat carrying means between said opposed plates and positioned outwardly of and circumferentially spaced from said meat carrying means for picking up liquid at the bottom of said drum and depositing said liquid on the meat within an adjacent meat carrying means as said scoops are carried upwardly in a circular path outwardly of the path of said meat carrying means, and a heating element disposed within and carried by the cover portion of said drum adjacent said circular path for heating the outer surface of said meat as each meat carrying means passes adjacent said heating element.

4. In a barbecue machine of the type having a housing defining a cooking chamber and a rotisserie disposed within said housing driven by a motor disposed externally of said housing, the combination therewith of drain valve means for draining liquid from said housing, a vat disposed adjacent said housing feed valve means for feeding liquid from said vat to said housing and automatic means for controlling said valve means to drain liquid from said drum during the first portion of a cycle of the machine and for thereafter closing said drain valve means and opening said feed valve means to supply liquid to said drum during the latter part of said cycle.

5. A barbecue machine comprising a horizontally disposed drum having end plates and defining a cooking chamber, said drum being divided to provide a bottom portion and a cover portion, hinges joining said bottom portion and said cover portion, a rotisserie disposed within said drum, said rotisserie including a horizontal shaft carried by said bottom portion for rotation along substantially a horizontal axis, a motor disposed externally of said drum for rotating said shaft, a pair of opposed supporting plates carried by said shaft between said end plates, a plurality of meat carrying means rotatably supported between said opposed plates for movement in a circular path, a plurality of scoops disposed between said opposed plates outwardly of said meat carrying means for picking up liquid at the bottom of said drum and carrying the liquid outwardly of said meat and then depositing said liquid on the meat, a heating element disposed within the cover portion of said drum for heating the outer surface of said meat as each meat carrying means passes adjacent said heating element, drain valve means for draining liquid from said drum, feed valve means for feeding liquid to the bottom portion of said drum, duct means for introducing smoke into said drum, and means for simultaneously controlling said valve means to drain liquid from said drum during the first portion of a cycle of the machine and for thereafter closing said drain valve means and opening said feed valve means to supply liquid to said drum during the latter part of said cycle.

6. A barbecue machine comprising a horizontally disposed drum having end plates and defining a cooking chamber, said drum being divided to provide a bottom portion and a cover portion, hinges joining said bottom portion and said cover portion, a rotisserie disposed within said drum, said rotisserie including a horizontal shaft disposed for rotation along substantially the axis of said drum, a motor disposed externally of said drum for rotating said shaft, a heating element disposed within the cover portion of said drum for heating meat carried by said rotisserie, drain valve means for draining liquid from said drum, a vat disposed adjacent said drum, feed valve means for feeding liquid from said vat to said drum, means for simultaneously controlling said valve means to drain liquid from said drum during the first portion of a cycle of the machine and for thereafter closing said drain valve means and opening said feed valve means to supply liquid to said drum during the latter part of said cycle, and means for supplying said liquid continuously to said meat during said latter portion of said cycle.

References Cited by the Examiner

UNITED STATES PATENTS

| | | | |
|---|---|---|---|
| 1,476,215 | 12/1923 | Pace | 99—421 |
| 2,138,813 | 12/1938 | Bemis | 99—352 |
| 2,160,953 | 6/1939 | Berbeles | 99—345 |
| 2,181,847 | 11/1939 | Finizio | 99—421 |
| 2,199,584 | 5/1940 | Bemis | 99—107 |
| 2,558,569 | 6/1951 | Koch | 99—443 |
| 2,696,163 | 12/1954 | Galley | 99—427 |
| 2,722,822 | 11/1955 | Wilson | 99—421 |
| 2,785,624 | 3/1957 | Brittain | 99—346 X |
| 2,792,773 | 5/1957 | Barker | 99—421 |
| 2,796,019 | 6/1957 | Vaughn | 99—346 |
| 2,885,951 | 5/1959 | Wolske | 99—346 |
| 2,945,767 | 7/1960 | Phelan et al. | 99—107 |
| 2,947,240 | 8/1960 | Bloxsom | 99—345 |

FOREIGN PATENTS 259,779  6/1949  Switzerland.

ROBERT E. PULFREY, *Primary Examiner.*

H. LORD, LAWRENCE CHARLES, *Examiners.*